(12) United States Patent
Huggett

(10) Patent No.: US 6,407,663 B1
(45) Date of Patent: Jun. 18, 2002

(54) MULTI-FUNCTION DISPLAY METER SYSTEM FOR A MOTORCYCLE

(75) Inventor: Jeffery W. Huggett, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 09/105,520

(22) Filed: Jun. 26, 1998

(51) Int. Cl.⁷ .................................................. B60Q 1/00
(52) U.S. Cl. ...................... 340/461; 340/432; 340/438; 340/459; 340/441; 200/61.54; 362/473
(58) Field of Search .............................. 340/425.5, 427, 340/432, 438, 459, 461, 441; 200/61.54; 701/29; 180/90; 362/473, 474

(56) References Cited

U.S. PATENT DOCUMENTS

| | | | |
|---|---|---|---|
| 3,834,249 A | 9/1974 | Bothwell | 340/432 |
| 4,071,892 A | 1/1978 | Genzling | 364/424 |
| D261,752 S | 11/1981 | Iwakura | D12/114 |
| 4,334,190 A | 6/1982 | Sochaczevski | 324/171 |
| 4,455,463 A | 6/1984 | Röhl | 200/61.85 |
| 4,464,933 A | 8/1984 | Santis | 73/493 |
| D275,944 S | 10/1984 | Ito | D12/192 |
| D276,707 S | 12/1984 | Segan et al. | D10/46 |
| D279,975 S | 8/1985 | Akira et al. | D12/192 |
| 4,642,606 A * | 2/1987 | Tsuyama | 340/432 |
| 4,695,958 A | 9/1987 | Mackenroth | 116/29 X |
| 4,792,783 A * | 12/1988 | Burgess et al. | 340/461 |
| 4,848,154 A | 7/1989 | Panzica | 73/493 |
| 4,862,395 A | 8/1989 | Fey et al. | 340/332 X |
| D304,306 S | 10/1989 | Kagayama | D10/46 |
| 4,887,249 A | 12/1989 | Thinesen | 340/432 |
| 4,939,934 A | 7/1990 | Ritzenthaler et al. | 73/431 |
| D312,052 S | 11/1990 | Read | D10/70 |
| 5,371,487 A | 12/1994 | Hoffman et al. | 340/439 X |
| 5,437,185 A | 8/1995 | Panzica | 73/493 |
| 5,453,939 A | 9/1995 | Hoffman et al. | 340/432 |
| 5,545,982 A | 8/1996 | Vlakancic | 324/174 |
| 5,578,985 A | 11/1996 | Cremers et al. | 340/461 |
| 5,629,668 A * | 5/1997 | Downs | 340/432 |
| 5,644,289 A | 7/1997 | Frehner et al. | 340/432 |
| 5,648,755 A * | 7/1997 | Yagihashi | 340/439 |
| 6,009,355 A * | 12/1999 | Obradovich et al. | 701/1 |
| 6,060,985 A * | 5/2000 | Siviero | 340/461 |
| 6,084,506 A * | 7/2000 | Irie | 340/432 |

* cited by examiner

Primary Examiner—Daryl Pope
(74) Attorney, Agent, or Firm—Fredrikson & Byron, P.A.

(57) ABSTRACT

A multi-function display meter system for a motorized vehicle such as a motorcycle. The display system has a microprocessor-based controller that stores a value for each of a plurality of predetermined indication modes. A mode switch may be used to select one of the indication modes for display on a display unit, and a set switch may be used to set the value of at least one of the indication modes when that mode is selectively displayed. On a vehicle with handlebars, the mode and set switch are conveniently located on opposite handlebars. One of the indication modes may be a hi-beam icon brightness level whose level may be set when it is the selected mode. The system may also include a sensor that senses information related to the vehicle, such as the electrical system voltage level and whether the engine is running. When the electrical system voltage level is the selected mode, the display unit displays both the electrical system voltage level and an indication whether this level is the battery voltage or the alternator voltage based upon whether the engine is running.

28 Claims, 7 Drawing Sheets

MULTI-FUNCTION DISPLAY METER SYSTEM FOR A MOTORCYCLE

TECHNICAL FIELD

The present invention relates to meter display systems for vehicles, and in particular, to a multi-function display meter system for a motorcycle.

BACKGROUND OF THE INVENTION

The present invention relates in general to devices which provide information to the operator of a motorized vehicle by displaying multiple measured vehicle parameters, such as speed, distance, trip distance, RPM, fuel level, etc. Such multi-function display units are well known and are used on many types of vehicles. One challenge for designers of such displays is how to display several different vehicle parameters within the limited display space available. This becomes even a greater issue when designing displays for smaller vehicles such as motorcycles, all-terrain vehicles ("ATVs"), personal watercraft, snowmobiles, or other smaller vehicles that have handlebars. Such vehicles do not have a large dashboard space for locating multiple instruments and indicators.

Prior art display units address this problem by using a single display area, such as a liquid crystal display (LCD) or light emitting diode (LED) display, to display several vehicle parameters. The operator of such prior art devices must "scroll" through various indication modes shown on the display until the mode desired is displayed. For instance, U.S. Pat. No. 5,644,289 discloses a compact instrument panel whose housing has an adjustment button for resetting the instrument's various indicator modes. If this instrument panel was mounted on a vehicle with handlebars (such as one of the vehicles enumerated above), the vehicle operator would necessarily have to release one of the handlebars to scroll and/or reset the instrument panel, leaving only one hand to steer the vehicle.

Aside from displaying vehicle parameters, such as speed, distance, trip distance, RPM, and fuel level, many prior art display units have indicator lights warning of low fuel, low oil pressure, low voltage, etc. (see, e.g., U.S. Pat. Nos. 5,648,755, 5,453,939, and 5,578,985). One indicator light typically indicates the activation of the vehicle's hi-beam headlight(s). To be effective, the hi-beam indicator (typically an illuminated blue icon of a headlight) must be bright enough to be visible even in daylight. Such a bright indicator may be distracting at night, however.

Although many prior art displays have a low voltage indicator light, the indication may appear too late in time to be effective. For instance, if the vehicle is a great distance from a repair facility when the indicator light illuminates, the vehicle may stall before it can be repaired.

SUMMARY OF THE INVENTION

The invention provides a multi-function display meter system for a motorized vehicle. In one preferred embodiment, the display system is mounted on a motorcycle with a chassis carrying a straddle-type seat which is sufficiently narrow to be straddled by a rider. Front and rear wheels are mounted to the chassis, and left and right handlebars are connected to the front wheel for steering the front wheel. The display system has a controller that stores a value for each of a plurality of predetermined indication modes. A display unit, that is connected to the controller, displays the value of a selected mode of the predetermined indication modes. The vehicle is steered with two handlebars which are positioned oppositely. A mode switch is mounted on one handlebar, and a set switch is conveniently mounted on the other handlebar. Each switch is connected to the controller. The mode switch may be used to select one of the predetermined indication modes as the selected mode, and, therefore, the displayed mode. The set switch may be used to set the value of at least one of the predetermined indication modes when that indication mode is the selected mode.

In an alternative embodiment, the display system has a microprocessor-based controller that stores a value for each of a plurality of predetermined indication modes, where one of the indication modes is a hi-beam icon brightness level. A display unit is connected to the controller for displaying the value of a selected mode. A mode switch is also connected to the controller and may be used to select one of the indication modes as the selected mode, and therefore the displayed mode. A set switch, connected to the controller, may be used to set the value of the hi-beam icon brightness level when it is the selected mode.

In another alternative embodiment, the display system has a microprocessor-based controller that stores a value for each of a plurality of predetermined indication modes, where one of the indication modes is the electrical system's voltage level. A sensor, connected to the controller, senses the electrical system voltage level. A mode switch is also connected to the controller and may be used to select one of the indication modes as the selected mode, and therefore the displayed mode. A display unit, connected to the controller, displays the value of the selected mode. If the electrical system voltage level is the selected mode, the display unit displays the electrical system voltage level.

In another alternative embodiment, the display system has a microprocessor-based controller that stores a plurality of predetermined indication modes, where one of the indication modes is the electrical system's voltage level. A sensor, connected to the controller, senses whether the engine is ring. If the engine is running, the electrical system voltage level is the vehicle's alternator voltage level. If the engine is not running, the electrical system voltage level is the battery voltage level. A mode switch is also connected to the controller and may be used to select one of the indication modes as the selected mode, and therefore the displayed mode. A display unit is connected to the controller. If the electrical system voltage level is the selected mode, the display unit displays an indication of whether the electrical system voltage level is the battery voltage or the alternator voltage.

DETAILED DESCRIPTION OF THE INVENTION

Figure 1:
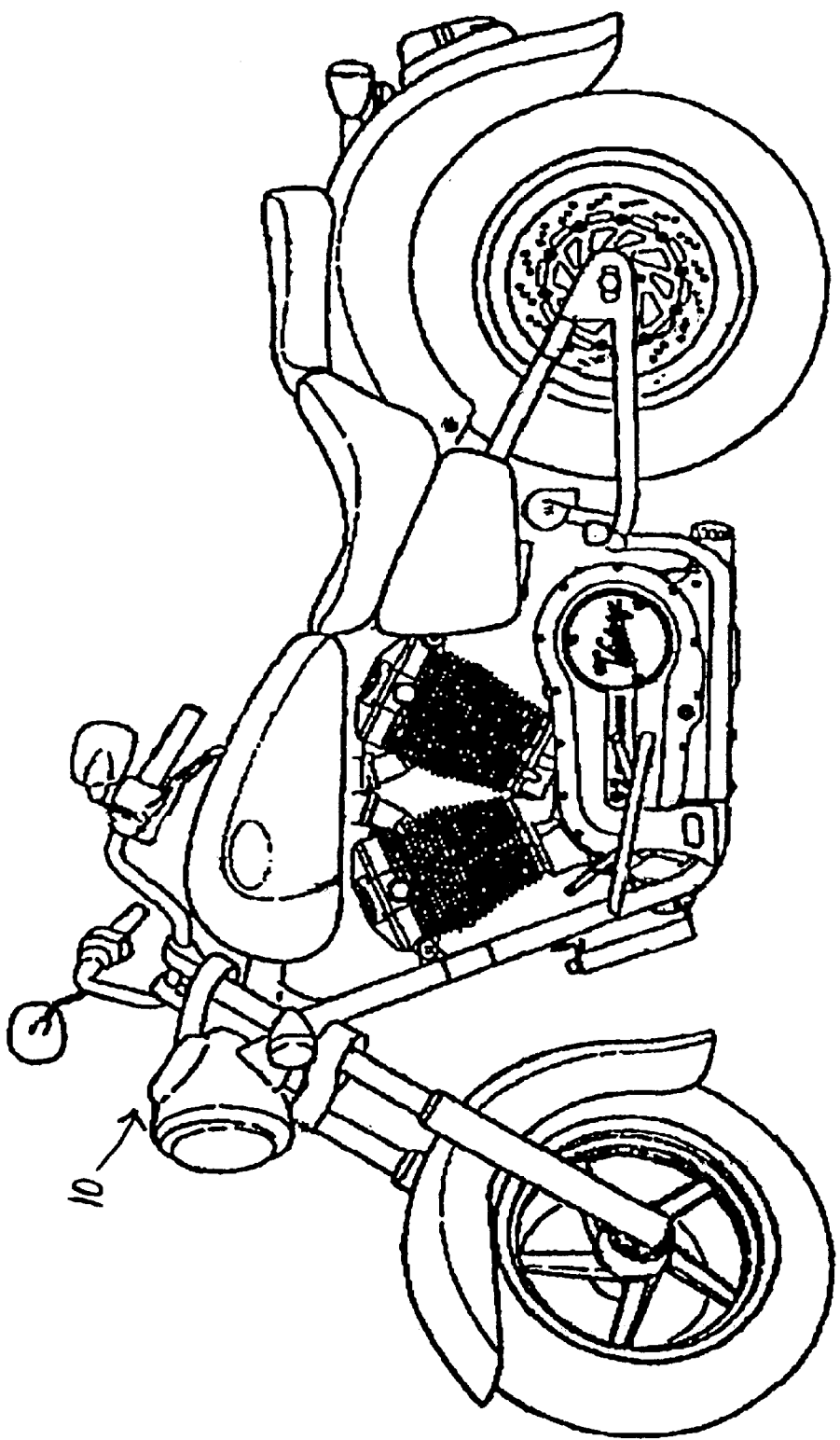
FIG. 1 is a perspective view of a vehicle having a multi-function display meter in accordance with one embodiment of the invention mounted thereon.

The drawings depict a preferred embodiment of a multi-function display meter system of the invention. It will be understood, however, that many of the specific details of the multi-function display meter system illustrated in the drawings could be changed or modified by one of ordinary skill in the art without departing significantly from the spirit of the invention.

Figure 2:
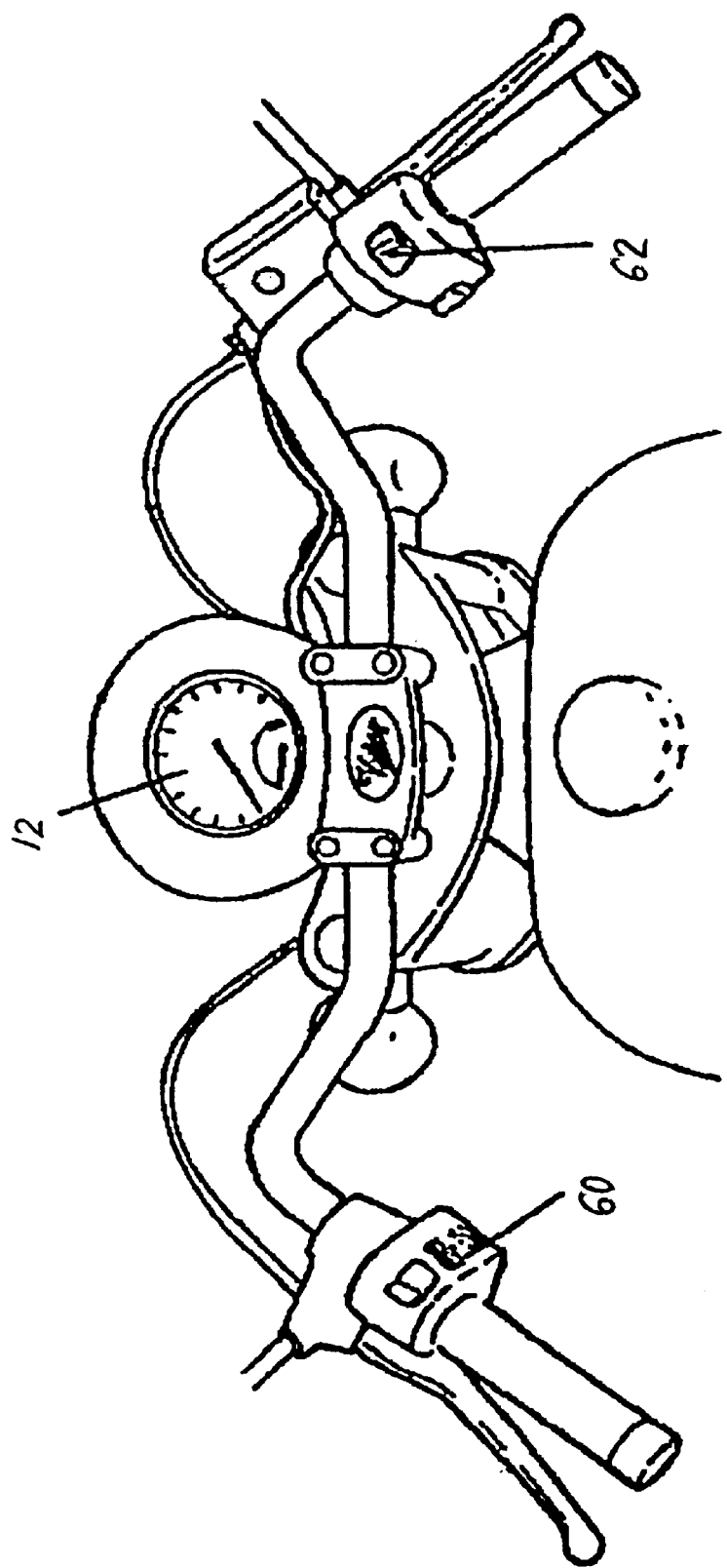
FIG. 2 is an enlarged perspective view of a portion of the vehicle of FIG. 1, illustrating the view from the rider's perspective.
Figure 3:
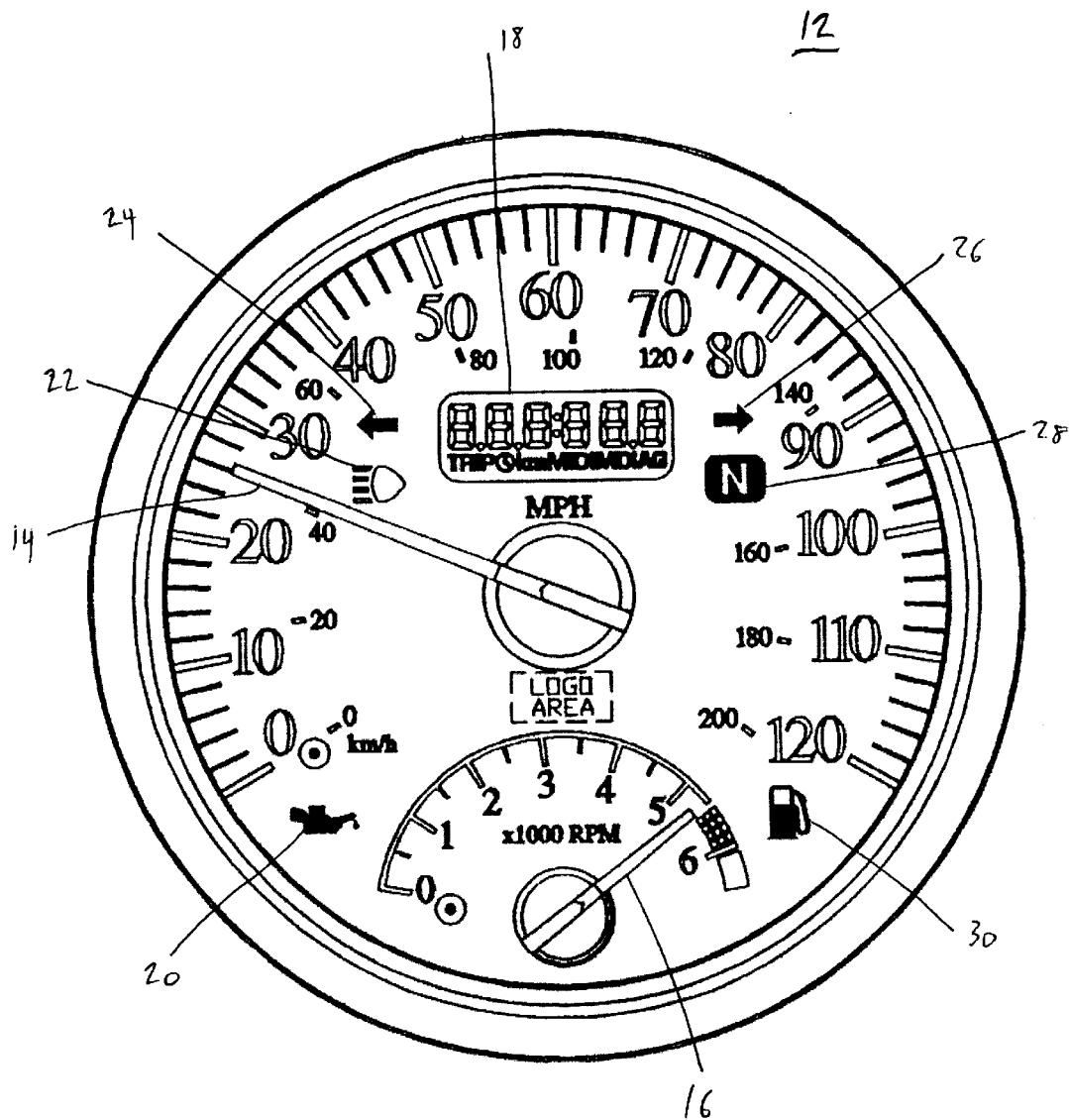
FIG. 3 is an enlarged view of a typical display for the multi-function display meter system shown in FIG. 1.

As shown in FIG. 1, a preferred embodiment of the multi-function display meter system 10 is shown mounted on a motorcycle. The display meter system could be used on any type of vehicle that is steered by handlebars, such as a motorcycle, an all-terrain vehicle (ATV), a snowmobile, a personal watercraft, etc. With reference to FIG. 2, a preferred embodiment of the invention is shown mounted between two handlebars for easy viewing by the vehicle's rider. However, the multi-function display meter system 10 could be mounted anywhere on the vehicle. FIG. 3 shows a typical display 12 for the multi-function display meter system. As shown, the display 12 comprises a speedometer 14, a tachometer 16, a liquid crystal display area 18, and a series of indicator icons that may be illuminated. These indicator icons include a low oil pressure icon 20, a hi-beam enabled icon 22, a left turn signal icon 24, a right turn signal icon 26, a neutral transmission icon 28, and a low fuel icon 30. Other indicators could also be provided on the display unit.

Figure 4:
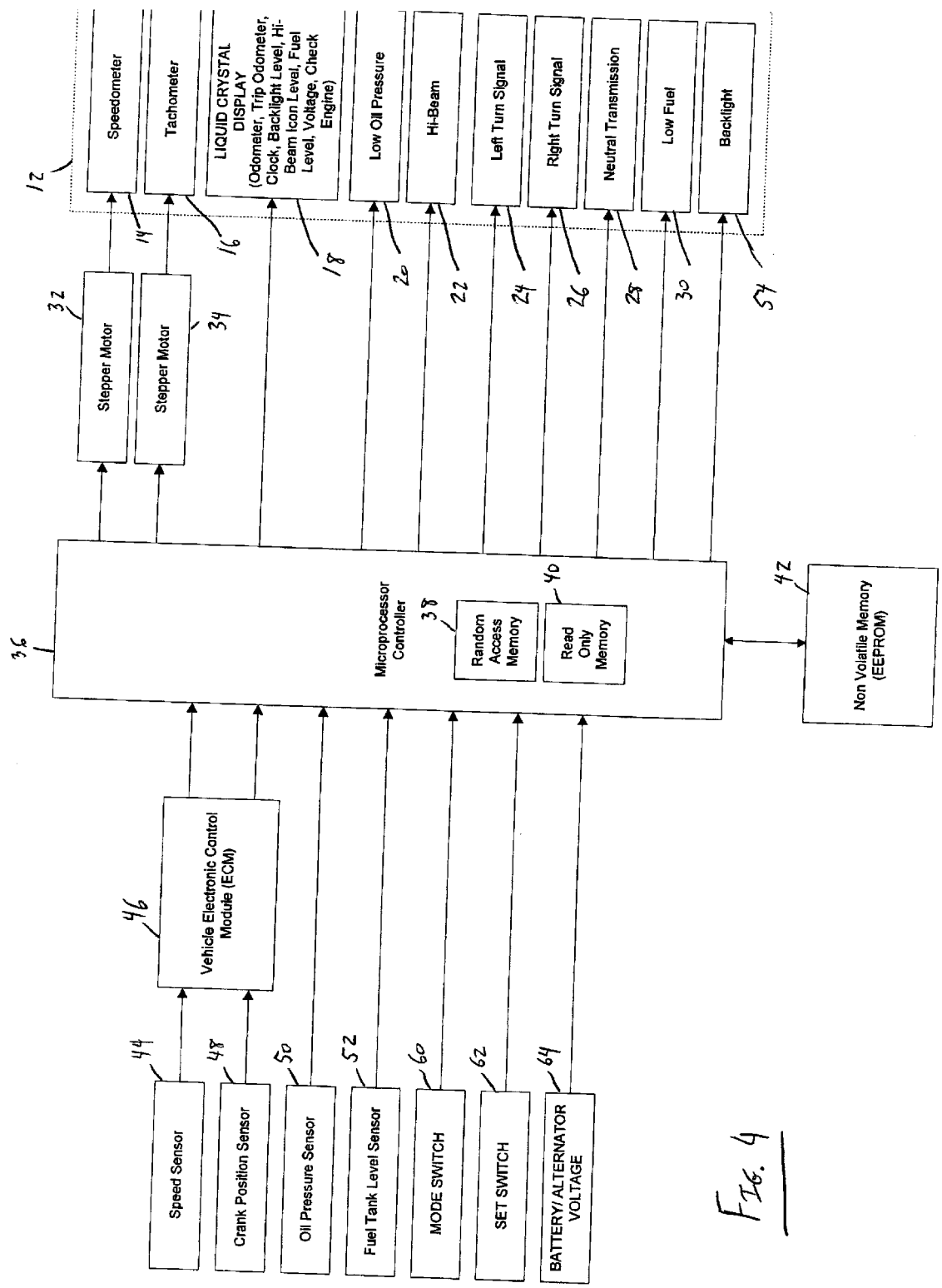
FIG. 4 is a hardware block diagram of the multi-function display meter system in accordance with one embodiment of the invention.

FIG. 4 shows, schematically, a block diagram of the hardware configuration of the display meter system 10. As also shown in FIG. 3, the display unit 12 shown in FIG. 4 comprises a speedometer 14, a tachometer 16, a liquid crystal display area 18, a low oil pressure icon 20, a hi-beam enabled icon 22, a left turn signal icon 24, a right turn signal icon 26, a neutral transmission icon 28, and a low fuel icon 30. The speedometer 14 and the tachometer 16 are driven by stepper motors 32 and 34, respectively. The stepper motors 32 and 34, and the series of indicator icons 20–30 are each connected to the controller 36. The preferred embodiment uses a microprocessor based controller manufactured by Microchip and identified as integrated circuit PIC16C73A20/ISP. It should be understood, however, that other controllers including those without integrated microprocessors could be used. The controller 36 preferably contains at least 192 bytes of random access memory (RAM) 38 and 4 Kilobytes of hard code written read only memory (ROM) 40 containing operating software written in "C" programming language. The controller is preferably operated at 10 MHz. The controller 36 is preferably connected serially to at least 1 Kilobyte of non-volatile memory stored in an EEPROM 42. The EEPROM 42 is driven directly by the controller 36 and is used for storing information over extended periods without power. Such information may include values for the odometer, the trip odometer, and the clock.

The vehicle speed is displayed by a pointer moved by the stepper motor 32 from a velocity of 0 to 120 miles per hour. The vehicle speed is sensed by a hall effect speed sensor 44 that is capable of detecting a single edge of a passing tooth and providing a square waveform to the vehicle electronic control module (ECM) 46 of a variable frequency. The ECM 46 is, in turn, connected to the controller 36. Similar to the speedometer 14, the tachometer 16 is displayed by a pointer moved by stepper motor 34 from 0 to 6500 RPM. The engine speed is sensed by a hall effect crank position sensor 48 connected to the ECM 46.

The controller 36 directly controls the illumination of the several indicator lights 20–30 on the display unit 12. The controller will illuminate an incandescent lamp under the low oil pressure icon 20, which is a red ISO oil can symbol, when the vehicle's oil pressure falls below a level such as 16 psi. An oil pressure sensor 50 is connected to the controller 36 for sensing-the vehicle oil pressure. The controller 36 will also illuminate an incandescent lamp under the hi-beam enabled icon 22, which is a blue ISO high beam symbol, when the vehicle's high beam light is enabled. The brightness of this light is adjustable. In addition, the controller will light amber LEDs under the left turn signal 24 and the right turn signal 26, which are ISO arrow symbols, when the vehicle's operator switches a handlebar mounted turn signal switch. Similarly, the controller 36 will illuminate incandescent lamps under the neutral transmission icon 28 and the low fuel icon 30 when the transmission is in neutral and when the fuel level falls below a predetermined volume, respectively. A fuel level sensor 52 is connected to the controller 36 for sensing the vehicle's fuel level. The controller 36 also connects to and controls the illumination of a backlight 54 of the display unit 12. Similar to the hi-beam icon light 22, the brightness of the backlight 54 is adjustable.

Figure 5:
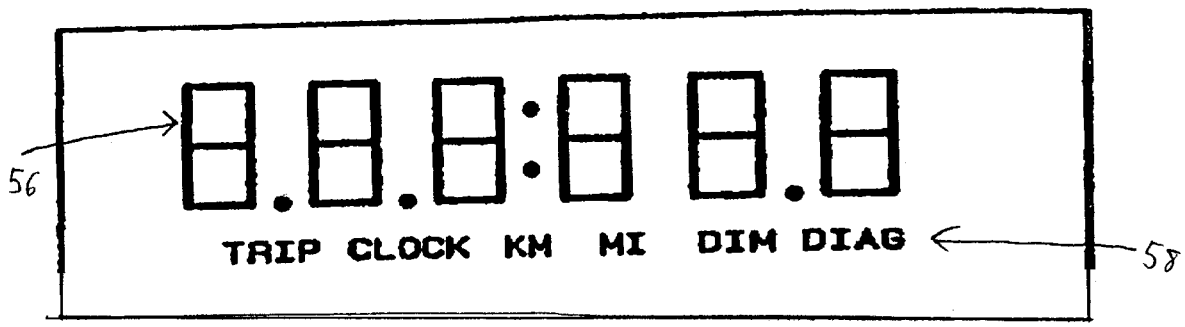
FIG. 5 is an enlarged view of the liquid crystal display of the display shown in FIG. 3.

The LCD 18 is driven by the controller 36 via a LCD driver chip (not shown). The driver chip is connected to the controller 36 by a two-wire data bus. As shown in expanded view in FIG. 5, the LCD preferably has six 7-segment displays 56, although many other displays could also be used such as LEDs, a CRT, flat panel, etc. Either a decimal point or a colon separates most of the 7-segment displays 56. Underneath the 7-segment displays 56 are several mode indicators 58. While the several mode indicators 58 shown in FIG. 5 are comprised of alphanumeric characters, it should be understood that symbols may be used instead or in combination with alphanumeric characters. The LCD 18 has at least the following indication modes: odometer, trip odometer, clock, backlight level, hi-beam icon level, fuel level, voltage, and diagnostics. The mode indicators 58, when displayed, indicate which of several indication modes the LCD 18 is presently displaying. Not all modes have a corresponding mode indicator. A display of MI or KM indicates that the odometer is the present indication mode. Similarly, a display of TRIP on the LCD indicates that trip odometer is the present display mode. Similarly, a display of CLOCK indicates that clock is the selected indication mode. Furthermore, a display of DIM or DIAG indicate that hi-beam icon brightness or diagnostics, respectively, are the selected indication modes.

Upon power-up of the vehicle, the default mode is the odometer. By toggling a mode switch 60, shown in FIG. 4, a rider of the vehicle may advance through the several indication modes to display the mode desired on the LCD 18. Each indication mode has a corresponding value. For instance, the odometer has a mileage value, the clock has a time value, the backlight level and hi-beam icon level each have a brightness value, etc. These values are retained by the controller's RAM 38 and displayed on the LCD 18 when their corresponding mode is selected. For some of the indication modes, the LCD 18 also displays the particular mode indicator 58 for the selected mode.

By toggling a set switch 62, shown schematically in FIG. 4, a rider of the vehicle may set or reset the values of some of the modes, when the particular mode is selected. For instance, as detailed below, the rider may reset the mileage value by toggling the set switch 62 when the trip odometer mode is selected.

With reference to FIG. 2, the set and mode switches are preferably located on opposite handlebars of the vehicle. Any type of electrical switches could be used. FIG. 2 shows the mode switch 60 on the left handlebar and the set switch 62 on the right handlebar. The location could be reversed, however. If the switches 60, 62 were located on the display 10 itself, the vehicle operator would necessarily have to release one of the handlebars to scroll and/or reset the LCD 18. The operator would therefore be left, undesirably, with only one hand to steer the vehicle.

Figure 6:
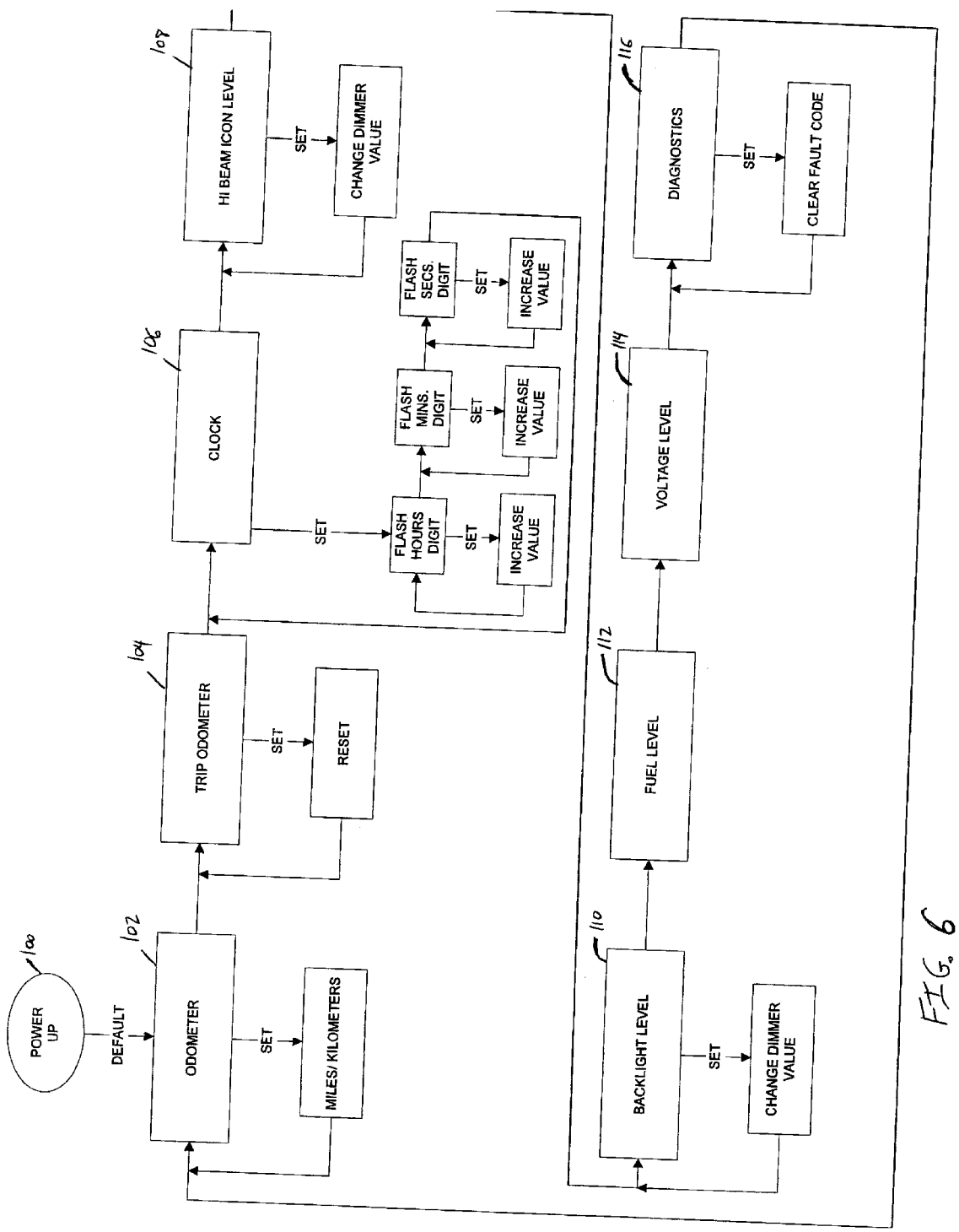
FIG. 6 is an liquid crystal display flow diagram of the multi-function display meter system in accordance with one embodiment of the invention.

In operation, as represented by the flow diagram in FIG. 6, the vehicle operator may toggle the set 62 and mode 60 switches to manipulate the LCD 18. Upon power up 100 of the vehicle and, correspondingly, the LCD 18, the LCD will start in the odometer mode 102 where the 7-segment display 56 shows the vehicle's cumulative distance traveled. By depressing the set switch 62, while in the odometer mode, the operator switches the display between miles and kilometers. Correspondingly, the mode indicator will also switch between displaying MI for mileage and KM for kilometers as the set switch 62 is depressed.

Depressing the mode switch 60 advances the LCD 18 to the next indicator mode, which, as shown in FIG. 6, is the trip odometer mode 104. In this mode, the distance traveled since the mode was last reset is displayed on the 7-segment display, and the TRIP mode indicator is displayed. The set switch 62 in this mode will reset the trip odometer value. In this mode, like all the modes, toggling the set switch preferably does not set or reset the values of the other modes. Toggling the mode switch again will select the next mode, the clock mode 106. In the clock mode, the time of day is displayed on the 7-segment display, and the CLOCK mode indicator is displayed. The clock may be set by depressing the set switch 62 for approximately three seconds. This will cause the display segments reserved for the hour digits to flash repeatedly. Depressing the set switch will advance the hour value, while depressing the mode switch will cause the display segments reserved for the minutes digits to flash. Similar to the hours digits, these may be advanced by the set button. Alternatively, the mode switch will cause the display segments reserved for the seconds to flash and be reset by the set switch. Another toggle of the mode switch will return the display to the normal clock mode.

The next mode that is selected by toggling the mode switch is the hi-beam icon level mode. Recall that the controller 36 will illuminate an incandescent lamp under the hi-beam enabled icon 22 when the vehicle's high beam light is enabled. To be effective, the hi-beam indicator must be bright enough to be visible even in daylight. Such a bright indicator may create a safety issue at night, however. For instance, the bright blue indicator icon may distract the vehicle operator at night when the operator is looking forward. Additionally, when the operator looks to the display at night, the operator's eyes may adjust from the dim night light to the bright light from the hi-beam indicator, thereby affecting the operator's vision upon looking away from the display. The brightness of the high beam icon 22 is therefore adjustable.

Figure 7:
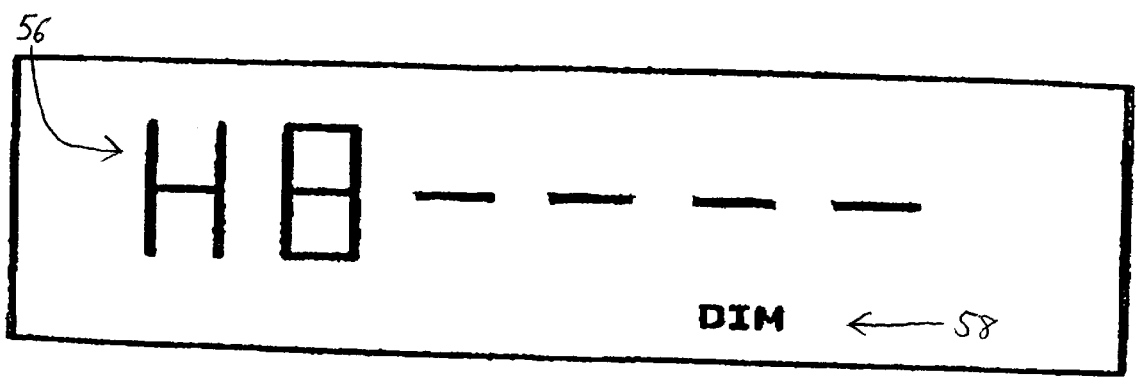
FIG. 7 shows a typical display of the LCD shown in FIG. 5 when the multi-function display meter system of the invention is in the hi-beam icon brightness mode.

FIG. 7 shows a typical display of the LCD 18 in the hi-beam icon brightness mode 108. DIM is displayed as a mode indicator. In addition, the first two segments display HB for high beam to also indicate the presently selected mode. The four bars or line segments on the remaining display segments indicate the value or level of the hi-beam icon brightness. The intensity of the hi-beam icon brightness may be proportionately dimmed one level of a total of four levels each time the set mode is depressed. With each of the four reductions in intensity, one less bar or line segment is displayed. The fifth depression of the set mode will return the brightness to full intensity and, correspondingly, to a display of four bars.

The next mode, with reference back to FIG. 6, selected by a toggle of the mode switch 60 is the backlight brightness mode. Recall that the controller 36 controls the illumination of a backlight 54 of the display unit 12. Similar to the hi-beam icon light 22, the brightness of the backlight 54 is adjustable. In the backlight brightness mode 110, DIM remains displayed as a mode indicator, but the first two 7-segment displays no longer display HB. Instead, all six 7-segment displays show a single segment at full backlight intensity. Only slightly different from the hi-beam icon brightness, the backlight intensity may be dimmed proportionately one level of a total of six levels each time the set mode is depressed. The 7-segment displays will show in numbers of bars the proportional part of the dimming.

Depressing the mode switch 60 again will advance the selected mode to the fuel level mode 112. Recall that the fuel level is sensed by fuel tank level sensor 52. In the fuel level mode 112, none of the mode indicators 58 are displayed. Instead, the fuel level of the vehicle will be numerically displayed to one decimal place on the first three 7-segment displays followed by the letters GAL or L, depending upon the standard of units selected. The set switch 62 may be depressed to toggle between GAL for gallons and L for liters.

The vehicle rider may select the next indication mode, the electrical system voltage level mode 114, by another toggle of the mode switch 60. Either a voltage sensor connected to the controller 36 or the controller 36 itself senses the electrical system voltage 64. In the voltage level mode 114, the electrical system voltage level is numerically displayed to one decimal place on the first three 7-segment displays. Like the fuel level mode 112, none of the mode indicators 58 are displayed in the voltage level mode 114. Instead, the letters ALt or BAt are displayed on the right three 7-segment displays to indicate both the mode selected and the voltage source. If the vehicle engine is not running, the electrical system voltage is sourced by the battery, or "BAt" as indicated by the display. If the engine is running, however, the system voltage is provided by the alternator and generator, or "ALt" as indicated by the display. Preferably, the controller 36 measures the engine speed through the crank position sensor 48 to determine if the engine is running. The controller 36 may sense one or more other vehicle parameters, however, to determine if the engine is running. For instance, measurements of engine vibration, fuel flow or consumption, ignition position, oxygen content in the exhaust, etc. may be used in addition to or in place of engine speed.

The next indication mode is the engine diagnostics mode 116. In this mode, the DIAG mode indicator 58 will be displayed. In addition, if the controller 36 diagnoses an engine problem, a numeric code or symbol representative of the diagnosed problem will be displayed in the 7-segment display area 56. Toggling the set switch 62 in this mode will clear the fault code display. Depression of the mode switch will return the display to the first display mode, i.e., the odometer mode 102.

While a preferred embodiment of the present invention has been described, it should be understood that various changes, adaptations and modifications may be made therein without departing from the spirit of the invention and the scope of the appended claims.

What is claimed is:

1. A motorcycle comprising:

a chassis carrying a straddle-type seat which is sufficiently narrow to be straddled by a rider;

front and rear wheels mounted to the chassis, and left and right handlebars connected to the front wheel for steering the front wheel; and a multi-function display system, comprising:
  a controller having stored therein a value for each of a plurality of predetermined indication modes;
  a display unit driven by the controller for displaying the value of a selected mode;
  a mode switch operatively connected to the controller and mounted on one of the handlebars, the mode switch being operable to select one of the indication modes as the selected mode; and
  a set switch operatively connected to the controller and mounted on the other handlebar, the set switch being operable to set the value of at least one of the indication modes when it is the selected mode.

2. The motorcycle of claim 1, further comprising a sensor operatively connected to the controller for sensing information related to the motorcycle, and wherein at least one of the indication modes has a value based on the sensed information.

3. The motorcycle of claim 1, wherein the set switch sets the value of at least one of the indication modes when it is the selected mode without affecting the value of any other of the indication modes.

4. A motorcycle comprising:

a chassis carrying a straddle-type seat which is sufficiently narrow to be straddled by a rider;

front and rear wheels mounted to the chassis, and left and right handlebars connected to the front wheel for steering the front wheel; and a multi-function display system mounted on the motorcycle, comprising:
  a controller having stored therein a value for each of a plurality of predetermined indication modes, one indication mode being a hi-beam icon brightness level;
  a display unit driven by the controller for displaying the value of a selected mode;
  a mode switch operatively connected to the controller, the mode switch for selecting one of the predetermined indication modes as the selected mode; and
  a set switch operatively connected to the controller, the set switch for setting the value of the hi-beam icon brightness level when it is the selected mode.

5. The motorcycle of claim 4, wherein the display unit comprises a hi-beam icon having a brightness level, and wherein setting the value of the hi-beam brightness level indication mode adjusts the brightness level of the hi-beam icon display.

6. The motorcycle of claim 4, wherein the set switch sets the value of at least one of the indication modes when that indication mode is the selected mode.

7. The motorcycle of claim 6, wherein the set switch sets the value of the hi-beam icon brightness level when it is the selected mode without affecting the value of any other of the indication modes.

8. A motorcycle comprising:

a chassis carrying a straddle-type seat which is sufficiently narrow to be straddled by a rider;

front and rear wheels and an engine mounted to the chassis, and left and right handlebars connected to the front wheel for steering the front wheel; and a multi-function display system mounted on the motorcycle, comprising:
  a controller having stored therein a value for each of a plurality of predetermined indication modes, one indication mode being an electrical system voltage level;
  a sensor operatively connected to the controller and which senses information related to the vehicle, the sensor for sensing the value of the electrical system voltage level;
  a display unit driven by the controller for displaying the value of a selected mode; and
  a mode switch operatively connected to the controller, the mode switch being operable to select one of the predetermined indication modes as the selected mode, whereby the display unit displays the value of the electrical system voltage level when it is the selected mode.

9. The motorcycle of claim 8, wherein the value of the electrical system voltage level displayed by the display unit is a digital numeric value.

10. The motorcycle of claim 8, wherein the display unit is a liquid crystal display, and wherein the electrical system voltage level is displayed on the liquid crystal display.

11. The motorcycle of claim 8, wherein the controller determines whether the engine is running based on sensed information.

12. The motorcycle of claim 11, wherein the electrical system voltage level is a battery voltage level when the engine is not running and an alternator voltage level when the engine is running.

13. The motorcycle of claim 12, wherein the display unit displays an indication whether the electrical system voltage level is the battery voltage or the alternator voltage when the electrical system voltage level is the selected mode.

14. A motorcycle comprising:
a chassis carrying a straddle-type seat which is sufficiently narrow to be straddled by a rider;
front and rear wheels and an engine mounted to the chassis, and left and right handlebars connected to the front wheel for steering the front wheel; and
a multi-function display system mounted on the motorcycle, comprising:
a sensor for sensing information related to the motorcycle;
a controller having stored therein a plurality of predetermined indication modes, one indication mode being an electrical system voltage level, the electrical system voltage level being a vehicle battery voltage level if the engine is not running and being a vehicle alternator voltage level if the engine is running, the controller operatively connected to the sensor and for determining whether the engine is running based on sensed information;
a mode switch operatively connected to the controller, the mode switch for selecting one of the indication modes as a selected mode; and
a display unit driven by the controller, the display unit displaying an indication whether the electrical system voltage level is the battery voltage or the alternator voltage when the electrical system voltage level is the selected mode.

15. The motorcycle of claim 14, wherein the controller is adapted for storing a value for each of the indication modes, the sensor for sensing the value of the electrical system voltage level, and the display unit for displaying the value of the selected mode.

16. The motorcycle of claim 15, wherein the display unit displays the value of the electrical system voltage level digitally when the electrical system voltage level is the selected mode.

17. The motorcycle of claim 14, wherein the sensor comprises a crank position sensor for sensing revolutions of the engine.

18. The motorcycle of claims 1, 4, 8, or 14, wherein the display unit displays an indication of which of the indication modes is the selected mode.

19. The motorcycle of claims 1, 4, 8, or 14, wherein the display unit comprises a liquid crystal display, indicator icons, a speedometer, and a tachometer.

20. The motorcycle of claims 1, 4, 8, or 15, wherein the display unit comprises a liquid crystal display which displays the value of the selected mode.

21. The motorcycle of claims 1, 4, 8, or 14, wherein the plurality of predetermined indication modes comprises odometer, trip odometer, clock, backlight level, hi-beam icon brightness level, fuel level, and electrical system voltage level, and diagnostics.

22. A motorized vehicle, comprising:
a chassis carrying a straddle-type seat which is sufficiently narrow to be straddled by a rider, the chassis including left and right handlebars for steering the vehicle; and
a multi-function display system, comprising:
a controller having stored therein a value for each of a plurality of predetermined indication modes;
a display unit driven by the controller for displaying the value of a selected mode;
a mode switch operatively connected to the controller and mounted on one of the handlebars, the mode switch being operable to select one of the indication modes as the selected mode; and
a set switch operatively connected to the controller and mounted on the other handlebar, the set switch being operable to set the value of at least one of the indication modes when it is the selected mode.

23. The motorized vehicle of claim 22, wherein the set switch sets the value of at least one of the indication modes when it is the selected mode without affecting the value of any other of the indication modes.

24. A motorized vehicle, comprising:
a chassis carrying a straddle-type seat which is sufficiently narrow to be straddled by a rider, the chassis including left and right handlebars for steering the vehicle; and
a multi-function display system mounted on the motorcycle, comprising:
a controller having stored therein a value for each of a plurality of predetermined indication modes, one indication mode being a hi-beam icon brightness level;
a display unit driven by the controller for displaying the value of a selected mode;
a mode switch operatively connected to the controller, the mode switch for selecting one of the predetermined indication modes as the selected mode; and
a set switch operatively connected to the controller, the set switch for setting the value of the hi-beam icon brightness level when it is the selected mode.

25. The motorized vehicle of claim 24, wherein the display unit comprises a hi-beam icon having a brightness level, and wherein setting the value of the hi-beam brightness level indication mode adjusts the brightness level of the hi-beam icon display.

26. A motorized vehicle, comprising:
a chassis carrying a straddle-type seat which is sufficiently narrow to be straddled by a rider, the chassis having an engine and including left and right handlebars for steering the vehicle; and
a multi-function display system mounted on the motorcycle, comprising:
a controller having stored therein a value for each of a plurality of predetermined indication modes, one indication mode being an electrical system voltage level;
a sensor operatively connected to the controller and which senses information related to the vehicle, the sensor for sensing the value of the electrical system voltage level;
a display unit driven by the controller for displaying the value of a selected mode; and
a mode switch operatively connected to the controller, the mode switch being operable to select one of the predetermined indication modes as the selected mode, whereby the display unit displays the value of the electrical system voltage level when it is the selected mode.

27. A motorized vehicle, comprising:

a chassis carrying a straddle-type seat which is sufficiently narrow to be straddled by a rider, the chassis having an engine and including left and right handlebars for steering the vehicle; and a multi-function display system mounted on the motorcycle, comprising:

a sensor for sensing information related to the motorcycle;

a controller having stored therein a plurality of predetermined indication modes, one indication mode being an electrical system voltage level, the electrical system voltage level being a vehicle battery voltage level if the engine is not running and being a vehicle alternator voltage level if the engine is running, the controller operatively connected to the sensor and for determining whether the engine is running based on sensed information;

a mode switch operatively connected to the controller, the mode switch for selecting one of the indication modes as a selected mode; and a display unit driven by the controller, the display unit displaying an indication whether the electrical system voltage level is the battery voltage or the alternator voltage when the electrical system voltage level is the selected mode.

28. A motorcycle comprising:

a chassis carrying a straddle-type seat which is sufficiently narrow to be straddled by a rider;

front and rear wheels and an engine mounted to the chassis, and left and right handlebars connected to the front wheel for steering the front wheel; and a multi-function display system, comprising:

a controller having stored therein a value for each of a plurality of predetermined indication modes, one indication mode being a hi-beam icon brightness level, another indication mode being an electrical system voltage level, the electrical system voltage level being a vehicle battery voltage level if the engine is not running and being a vehicle alternator voltage level if the engine is running;

a sensor operatively connected to the controller and being operable to sense information related to the vehicle, the controller for determining whether the engine is running based on sensed information, the sensor being operable to sense the value of the electrical system voltage level;

display unit driven by the controller for displaying the value of a selected mode, the display unit displaying an indication whether the electrical system voltage level is the battery voltage or the alternator voltage when the electrical system voltage level is the selected mode;

a mode switch operatively connected to the controller and mounted on one of the handlebars, the mode switch being operable to select one of the indication modes as the selected mode; and a set switch operatively connected to the controller and mounted on the other handlebar, the set switch being operable to set the value of at least one of the indication modes when it is the selected mode.

\* \* \* \* \*